(12) United States Patent
Agarwal et al.

(10) Patent No.: US 12,101,287 B2
(45) Date of Patent: *Sep. 24, 2024

(54) SYSTEM AND METHOD FOR AUTOMATED MESSAGE DELIVERY PRIORITIZATION

(71) Applicant: Twilio Inc., San Francisco, CA (US)

(72) Inventors: Amit Agarwal, Sunnyvale, CA (US); Peter Tan, San Francisco, CA (US); Nariman Nazari, Malmo (CH)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,188

(22) Filed: Sep. 25, 2023

(65) Prior Publication Data

US 2024/0015127 A1    Jan. 11, 2024

Related U.S. Application Data

(63) Continuation of application No. 17/591,540, filed on Feb. 2, 2022, now Pat. No. 11,770,355.

(60) Provisional application No. 63/200,771, filed on Mar. 26, 2021.

(51) Int. Cl.
*H04L 51/226* (2022.01)
*H04L 51/046* (2022.01)
*H04L 51/214* (2022.01)
*H04L 67/62* (2022.01)

(52) U.S. Cl.
CPC .......... *H04L 51/226* (2022.05); *H04L 51/046* (2013.01); *H04L 51/214* (2022.05); *H04L 67/62* (2022.05)

(58) Field of Classification Search
CPC ..... H04L 51/226; H04L 51/214; H04L 67/62; H04L 51/046
USPC .......................................................... 709/206
See application file for complete search history.

(56) References Cited

U.S. PATENT DOCUMENTS

| | | | |
|---|---|---|---|
| 8,924,497 B2 * | 12/2014 | Sheridan | H04L 51/226 725/38 |
| 9,762,653 B2 * | 9/2017 | Basu | H04L 65/1101 |
| 9,955,014 B2 * | 4/2018 | Yoakum | H04M 3/5335 |
| 10,284,511 B2 * | 5/2019 | Robertson | G06Q 10/107 |
| 10,511,560 B2 * | 12/2019 | Kursun | H04L 51/234 |
| 11,082,387 B1 | 8/2021 | Vukich | |
| 2009/0132662 A1 | 5/2009 | Sheridan | |
| 2010/0312612 A1 | 12/2010 | Carr | |
| 2011/0093543 A1 | 4/2011 | Goldman | |
| 2013/0212047 A1 | 8/2013 | Lai | |
| 2015/0019953 A1* | 1/2015 | Freiman | H04N 21/4355 715/234 |
| 2018/0253659 A1* | 9/2018 | Lee | H04L 51/42 |
| 2019/0182196 A1* | 6/2019 | Avital | H04L 51/42 |
| 2020/0258044 A1 | 8/2020 | Lin | |
| 2021/0191843 A1* | 6/2021 | Stocker | G06F 18/2433 |

(Continued)

*Primary Examiner* — Sargon N Nano
(74) *Attorney, Agent, or Firm* — Lowenstein Sandler LLP

(57) ABSTRACT

Systems and methods for message delivery prioritization that can include receiving, via an application programming interface, a messaging request of an entity to transmit one or more messages to a plurality of users, selecting one or more message transmission options based on message-associated delivery attributes, and causing the one or more messages to be transmitted to the plurality of users using the selected one or more message transmission options.

18 Claims, 11 Drawing Sheets

(56) References Cited

U.S. PATENT DOCUMENTS

2021/0194843 A1* 6/2021 Vendrow .............. H04L 51/234
2023/0005511 A1  1/2023 Jhatakia

* cited by examiner

SYSTEM AND METHOD FOR AUTOMATED MESSAGE DELIVERY PRIORITIZATION

CROSS-REFERENCE TO RELATED APPLICATIONS

This application is a continuation application of co-pending U.S. patent application Ser. No. 17/591,540, filed Feb. 2, 2022, which claims the benefit of U.S. Provisional Application No. 63/200,771, filed Mar. 26, 2021, each of which is incorporated herein by reference.

TECHNICAL FIELD

An embodiment of the present subject matter relates generally to messaging communication and, more specifically, to a system and method for automated message delivery prioritization.

BACKGROUND

Many computer-implemented applications and services make use of various communication services to manage various forms of outbound communications with their users/customers. In particular, short message service (SMS), multimedia messaging service (MMS), and other forms of user messaging are often facilitated through the use of one or more communication services and channels.

Despite messages being sent for a diversity of purposes, messages are generally treated with the same urgency by receiving communication services and channels. However, some messages need to be delivered with high urgency, where delayed delivery may be unacceptable. Other messages may have very relaxed timing constraints, where the sender has no rigid restriction on when the messages are received. Different options for delivering a message may have different levels of performance or reliability.

Thus, there is a need in the message communication field to create new and useful systems and methods for automated message delivery prioritization.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
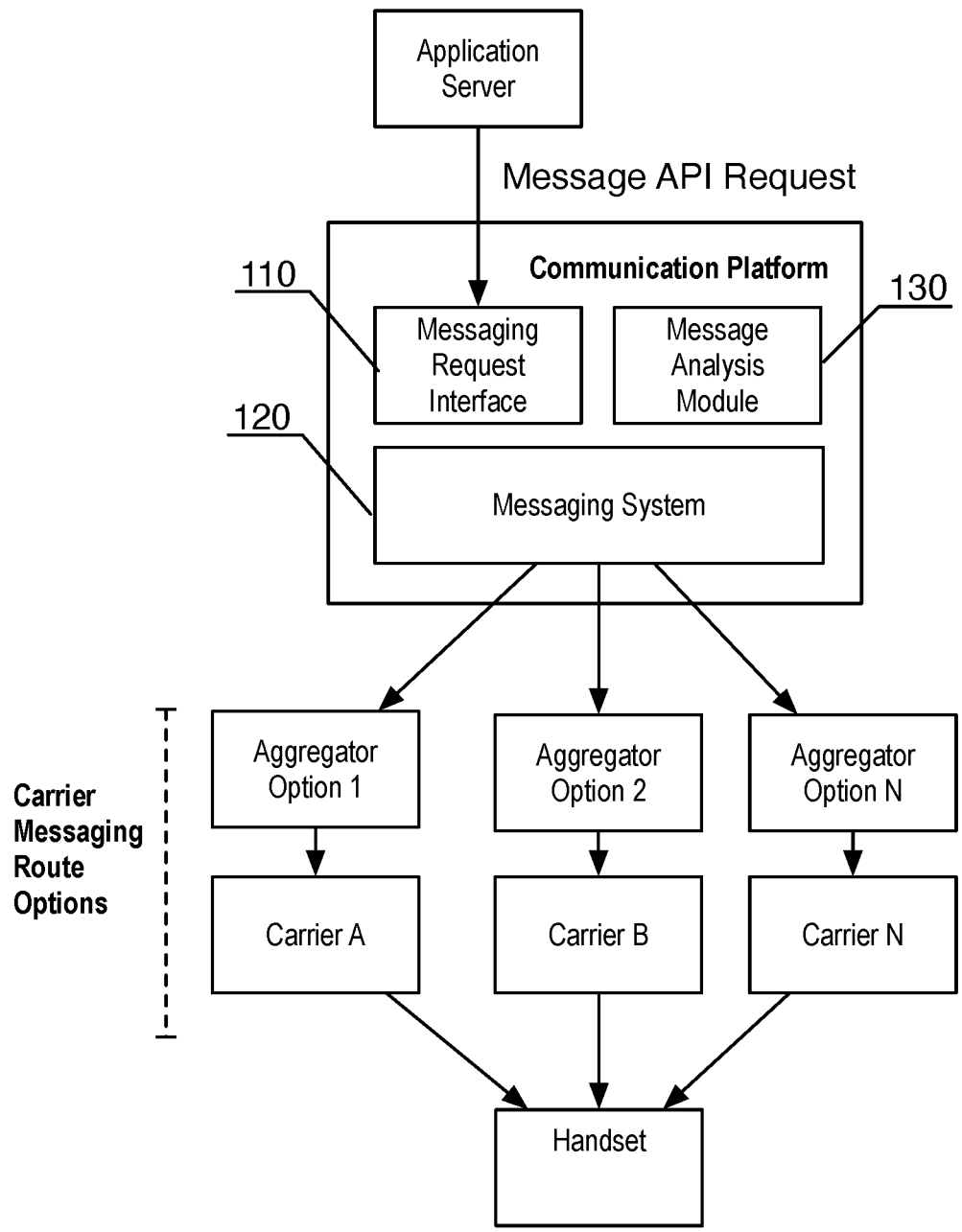
FIG. 1 is a system configuration, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for automating the prioritization and routing of messages for dynamically adjusting communication of digital messages according to the context of a messaging request.

Systems and methods for automated message delivery prioritization can use message analysis and/or other message-associated delivery attributes to determine a message-specific strategy for managing communication of messages to one or more recipients. The systems and methods can enable dynamic prioritization such that transmission of messages, the messaging channel, and/or the messaging route can be selected based on one or more messaging request attributes, such as timing priority, reliability priority, message value, and/or content. The systems and methods may be used so that messages are transmitted with enhanced delivery given the constraints surrounding a given messaging request. For example, the systems and methods may be implemented so that a message request with certain timing, probability of successful delivery, and/or value targets is transmitted using a messaging channel/route that works towards those targets.

In example embodiments, the systems and methods of the present disclosure may model message transmission options based on various deliverability attributes. The deliverability attributes can be metrics or properties that characterize objectives for how a message is communicated. Examples of deliverability attributes can include reliability (e.g., the rate of messages being properly delivered), timing (e.g., factors and limits factoring into when a message can be delivered using a message transmission option), and/or quality (e.g., limits in message body content such as media file limitations, encoding instructions, feature limitations, and the like). Additionally, value (e.g., cost/price) can be incorporated into the model of message transmission options. A machine learning model or another suitable data processing pipeline may be used in automating the selection of a message transmission option according to a set of contextual inputs.

Message transmission options can include different messaging channels and/or messaging routes within a messaging channel. Herein, messaging channel is used to characterize different forms of communication which may use different communication protocols or use different underlying communication technology (e.g., SMS vs IP) Examples of messaging channels can include PSTN-based (Public Switched Telephone Network based) messaging such as SMS (Short Message Service) or MMS (Multimedia Messaging Service), IP (Internet Protocol) messaging, and/or messaging via $3^{rd}$ party messaging platform (e.g., proprietary social media messaging, messaging applications, etc.). A messaging route as used herein characterizes a routing or transmission option within a particular messaging channel. A messaging route can be one of a set of possible intermediary routing options (e.g., a SMS gateway route) that can be communicated a messaging request for delegated handling of message handling. In the example of SMS and MMS messaging, a messaging route may be one of a set of different messaging gateways and/or carrier networks that can be used to facilitate transmission of a message. After delivering a message transmission request, a messaging route may then perform its own message routing operations, which result in delivery of the message to one or more destination client devices in a successful message transmission.

Message transmission options can additionally include options for how a message transmission is timed, scheduled, and/or ordered within a set of message transmissions. Message transmission options may have a message be updated with a target transmission window. Depending on the delivery attributes and resulting message transmission option(s), messages may be sent within a near term short window (e.g., within 30 second) or a relaxed transmission window (e.g., within the next hour or day). Such timing properties for message transmission may be used to load balance and/or otherwise distribute transmissions across an account and/or a communication service.

Message transmission options can additionally relate to the quality of message delivery and/or message value (e.g., cost of sending a message). Quality can relate to quality-related properties like message delivery success (e.g., likelihood of message being successfully delivered), message content integrity (likelihood that the message content is delivered within content changes or errors). Message value can relate to cost or credit related targets or restrictions, which may be translated into a message transmission option that accounts for such targets or restrictions. For example, different messaging routes may have different associated costs for affecting delivery of a message.

One or more message transmission options can be combined to determine a transmission plan, which characterizes the configuration for how a message is communicated or relayed.

In example embodiments, the systems and methods may extract a contextual understanding of the message and predicted priority to understand situations like when delivering a message as soon as possible is important, when a message can remain relevant during a sustained window, when a message has no time limitations, when a message may prioritize minimizing cost, when the content of a message can or cannot be modified, and/or other situations. Such message delivery attributes of a message may additionally depend on interpretation of the message in a broader context such as the context of multiple messages being sent to an individual and/or the delivery targets relative to other messaging requests also happening within the communication platform. The transmission of the message(s) can be based on an interpreted priority level.

In example embodiments, the systems and methods may additionally or alternatively support the specification of deliverability attributes within a programmatic request used in requesting and/or initiating one or more outbound messages, which functions to expose an interface whereby an initiating entity can control deliverability. In example embodiments, the systems and methods enable a messaging API (Application Programming Interface) where one or more deliverability attributes can be specified such that transmission of the message can be executed based on the deliverability attribute(s). Such API request-associated delivery attributes may be specified within an API-based messaging request and/or otherwise referenced or associated with a messaging request. For example, a messaging API request may specify timing properties for how quickly the message should be sent, which can result in the message transmission being scheduled and performed with an objective of satisfying the timing properties. As described herein, other deliverability attributes may additionally or alternatively be used such as priority, quality, value/cost, and/or other properties.

In example embodiments, the systems and methods can further enable adapting of a model for message transmission options. The systems and methods may collect messaging delivery results and then incorporate such learning into the model used in selecting a message transmission option. The model can be a machine learning model trained to generate an output used in selecting one or more message transmission options given message properties (e.g., delivery attributes, message request timing, message request location related properties, message request content). The machine learning model may be trained on various inputs such as: message content, message route/channel used, message delivery feedback, combinations of message content to explicitly stated delivery attributes; message, timing of message requests, and/or other model inputs.

Additionally, the systems and methods may further incorporate such automated message delivery prioritization within a messaging system that supports fulfillment of competing messaging requests—independent requests from different entities making use of shared communication resources. Accordingly, the systems and methods may further manage messaging limits (e.g., message limits, rate limits, etc.), obligations (minimum or maximum message termination quotes), targets (termination targets), and/or coordinate message prioritization across distinct messaging requests. This may be used within a messaging system where different parts of a computing system are making different independent requests. This may also be used within a multi-tenant messaging system wherein multiple distinct entities are initiating messaging requests that are processed by shared computing resources.

The systems and methods can be used in managing the transmission of SMS and/or MMS messages. The systems and methods may be used by communication services that facilitate SMS and/or MMS communication using or acting as an SMS/MMS aggregator. In example embodiments, the systems and methods can be used to facilitate management of how to coordinate the transmission of SMS/MMS messages across a number of messaging routes (e.g., SMS/MMS aggregators and/or carrier networks). The SMS and MMS messages may be communicated using SMPP (Short Message Peer-to-Peer) communication. The systems and methods may additionally or alternatively be used for managing communication of other types of messages such as RCS (Rich Communications Services) or other types of messages. The systems and methods may have particular utility when different telephone carrier networks are used which are accompanied with different usage costs and limits.

The systems and methods may be particularly useful for application-to-person (A2P) communications where outbound messages are initiated programmatically (e.g., not originating from an individual's phone). This may be used for large messaging campaigns or for applications where there will be a large volume of messages sent for the purpose of servicing an application's customers/users. The systems and methods may additionally or alternatively be used for peer-to-peer communications where communications are initiated and originated from another communication destination (e.g., phone number of a phone). For example, the systems and methods may be employed within an aggregator or carrier system to manage how to intelligently direct individual messages that are routed through their system. The systems and methods are not limited to A2P communications, however, and it will be apparent to one of ordinary skill in the art that systems and methods may additionally or alternatively be used with peer-to-peer (P2P) communications.

In example embodiments, the systems and methods may be employed in connection with a multi-tenant communication service. A multi-tenant communication service can be a software as a service (SaaS) communication platform that provides communication services to a wide diversity of users. The systems and methods may be employed by carrier or in connection to a carrier communication network. Herein, reference to a communication service will be used as the primary example of an operator of the systems and methods, but the systems and methods may be used with any suitable communication system.

The systems and methods may provide a number of potential benefits. The systems and methods are not limited to always providing such benefits and are presented only as exemplary representations for how the systems and methods may be put to use. The list of benefits is not intended to be exhaustive and other benefits may additionally or alternatively exist.

As one potential benefit, the systems and methods may provide better deliverability. The systems and methods enable messages to be treated based on their more individual requirements for a given message. When serving a diversity of types of messaging requests, this can result in better utilization of computing resources in facilitating messaging. In this way, message transmission options (e.g., message routes) can be better utilized, which can allow a communication service to better optimize for communication over quality routes.

As another potential benefit, the systems and methods can enable predicting message priorities and other deliverability attributes. This can enable a system to automatically prioritize messages according to predicted deliverability attributes. For example, the content of a message may be used in classifying the type of message and then appropriately scheduling the message.

As another potential benefit, the systems and methods can enable an interface whereby an initiator of a message transmission can be afforded a measure of control of how a message is sent. This may be provided through an API that supports specification of various deliverability attributes.

As another potential benefit, the systems and methods can also provide an improved interface for making programmatic requests for messages. The systems and methods may offer enhanced and customized deliverability of messages without requiring changes to existing messaging code. A communication service may offer programmatic control over some message priority-related properties, but message requests without explicit configuration of priority can still benefit from the systems and methods.

As another potential benefit, the systems and methods may facilitate reduced messaging costs through more efficient use of messaging routes. The systems and methods can potentially achieve better system utilization of less used and/or more cost-efficient messaging channels and/or routes. This can be implemented within the messaging infrastructure to offer reduced messaging costs to end users (e.g., application accounts). This may alternatively or additionally be implemented for more efficient operation of a communication service.

As another potential benefit, the systems and methods can enable automatic improvement of message delivery by collecting message delivery data and using that in updating a model used in determining message transmission options. For example, delivery and reading patterns of a particular user or destination endpoint as well as other destination information may be detected and tracked so that some qualifying messages can be transmitted at appropriate times. This may also work to improve message delivery across a wider diversity of geographic regions (possibly served by different messaging channels and routes), messaging channels, and endpoint destinations.

As shown in FIG. 1, a system for automated message delivery prioritization can include a messaging request interface 110, a messaging system 120, and a message analysis module 130. The messaging request interface 110 can be configured to communicate a messaging request to the message analysis module 130 to determine message transmission options and then the messaging system 120 is configured to apply the message transmission options in transmission of one or more outbound messages.

The messaging request interface 110 functions as a computer interface through which message requests are received and/or created. The system may include one or more types of messaging request interfaces 110.

In example embodiments, the messaging request interface 110 includes an application programming interface (API). For example, the messaging request interface 110 can include a messaging API whereby external entities or systems can send a communication to request sending of a message. The API may be used in programmatically requesting sending of one or more messages. In example embodiments, the API is implemented in connection with a multi-tenant communication service wherein different accounts (e.g., authenticated entities) can perform independent requests. These requests made through the API can be managed with consideration of other requests made within an account and/or across multiple accounts on the communication service.

The API of the messaging request interface 110 may be used in initiating general messaging or communication requests. For example, a messaging request may indicate one or more destination endpoints (e.g., recipient phone numbers), message content (e.g., text and/or media content), and possibly an origin endpoint (e.g., a phone number to use as the "sending" phone number). Various delivery attributes may be determined for such a request using various processes described herein such as performing content analysis by the message analysis module 130. In example embodiments, one or more delivery attributes may be specified in association with an account, such as including the delivery attribute within the API request or as an associated property of the messaging request (e.g., an account, endpoint, or messaging group setting).

The API of the messaging request interface 110 may be any suitable type of API such as a REST (Representational State Transfer) API, a GraphQL API, a SOAP (Simple Object Access Protocol) API, and/or any suitable type of API. In example embodiments, the communication platform can expose through the API, a set of API resources which when addressed may be used for requesting different actions, inspecting state or data, and/or otherwise interacting with the communication platform.

A REST API and/or another type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described, but it should not be interpreted as being limited to the HTTP protocol. HTTP requests (or any suitable request communication) to the communication platform may observe the principles of a RESTful design or the protocol of the type of API. RESTful is understood in this document to describe a Representational State Transfer architecture as is known in the art. The RESTful HTTP requests may be stateless, thus each message communicated contains all necessary information for processing the request and generating a response. The API service can include various resources, which act as endpoints that can act as a mechanism for specifying requested information or requesting particular actions. The resources can be expressed as URI's or resource paths. The RESTful API resources can additionally be responsive to different types of HTTP methods such as GET, PUT, POST and/or DELETE.

In example embodiments, the messaging request interface 110 includes a message request instruction module that can be called within an application, script, or other computer instruction execution. For example, a computing platform may support the execution of a set of program instructions where at least one instruction within a script or other application logic is used in specifying a message request and communicating that request.

In example embodiments, the messaging request interface 110 can include a console, administrator interface, or other suitable type of user interface, where user input is received and converted into a message request that can be relayed through the system to the messaging system 120. Such a user-facing interface can be a graphical user interface. Such a user interface may additionally work in connection with a programmatic interface.

The message request is a data object characterizing the properties of a message. Herein, the system is primarily associated with message requests that are programmatically initiated (e.g., an A2P message). In example embodiments, the message request could be one initiated from an inbound received message.

In general, the message request will include one or more destination endpoints, one or more origin endpoints, and message content. In example embodiments, some or some of these properties may be specified indirectly such as through system or account configuration. For example, all messages may be automatically assigned an origin endpoint that is associated with an account. The message content could include any suitable type of media content including, text, audio, image data, video data, multimedia, interactive media, data, and/or any suitable type of message content.

In example embodiments, a message request may include one or more deliverability attributes such as a reliability property, a timing property, a quality property, and/or value property. In some cases, alternative deliverability properties may be exposed. For example, one message API may support specification of one of a set of different message prioritization (e.g., high priority or low priority).

A reliability property may characterize a desired level of delivery reliability. A reliability property set for high reliability may lead to the selection of a message routing option where there is a high probability of messages being successfully delivered. Conversely, a reliability property set for default reliability (or low reliability prioritization) may select a message route with less prioritization of delivery reliability. The determination of a message transmission option may depend on various factors. The indication of a reliability related delivery attribute will alter the prioritization of transmission reliability within the consideration of other factors. For example, prioritization of timing and cost may be emphasized (e.g., increased weighting) or de-emphasized (e.g., decreased weighting) depending on if heightened reliability is indicated or not.

A timing property may characterize various timing objectives such as sending with high urgency or low urgency. Timing properties may be implemented in various ways. In example embodiments, a timing property may be indicative of some general prioritization within the queuing of messages. For example, time sensitive message may receive queued in a message queue for faster servicing by the messaging system 120. In example embodiments, a timing property may be indicated as specific timing requirements or objectives. For example, a timing property could be defined as a window of time in which a message is targeted for transmission. One message may have a short transmission targeted time window of 1 minute (e.g., a passcode related message) while another may have a large time window of multiple days (a marketing-related message with no specific deadline. In example embodiments, a timing property may define a window where, if the message is not serviced within the timing window, then the messaging request expires and would not be sent. A timing property could additionally have time of day, week, or month, or year related properties which can be used in determining preferred timing windows or undesired timing windows. For example, a message related to getting your morning routine started may have a timing window within a morning time window.

A quality property may characterize message objectives such as acceptable changes or limits to the message content.

For example, a quality property may result in prioritize a message transmission option that ensures high confidence message content will be delivered without augmentation (E.g., no encoding errors, no/less media compression, etc.). Quality properties may be handled similar to reliability properties where setting of a high-quality property or not can alter the consideration and determination of a message transmission option based on a balance of multiple factors in addition to quality such as timing and reliability.

A value property may characterize pricing or cost restrictions or goals. The value property in example embodiments may specify a maximum price. Value properties may be handled similar to reliability properties where setting of a high value property or alter the consideration and determination of a message transmission option based on a balance of multiple factors in addition to value such as timing and reliability. The value property in example embodiments may be coupled with other properties. For example, a first price may be specified for a first delivery time and a second lower price for a second later delivery time.

The message request may further support various features such as setting tiers of priorities, their own route prioritization rules, and the like.

In setting tiers of priorities, a set of delivery attributes may set priorities to various attributes used in determining a message transmission option. For example, a timing window could be a first priority set based on a timing delivery attribute, and then, upon identifying a set of candidate message transmission options, a final message transmission option could be selected based on a cost/value delivery attribute.

In setting route prioritization rules, a delivery attribute could set particular rules for routes and/or channels eligible as a message transmission option. For example, an approved or preferred route list and/or a banned or non-preferred route list could be set through one or more delivery attributes.

In example embodiments, various message-related features or properties are specified explicitly within the message request. In example embodiments, some or all message-related features or properties may be specified through account configuration or in other ways. For example, an account with a messaging platform may set the default message delivery attributes. As another example, an account may enable a feature to automatically predict delivery attributes based on the properties of a message request.

The messaging system 120 functions to interface with one or more communication network(s) and/or service(s) for communication of a message. In example embodiments, the messaging system 120 can include an interface to one or more carrier-based communication routes used in sending SMS, MMS, and/or other carrier-based messages. There may be multiple carrier-based communication routes that serve as different optional "routes" when sending communications over a carrier-based network (e.g., a mobile network). The messaging system 120 may additionally or alternatively include an interface to one or more over-the-top (OTT) messaging channels which may be offered by a 3rd party messaging platform (e.g., proprietary social media messaging, messaging applications, etc.).

When the messaging system 120 elects to send a message using a carrier-based channel, the message is communicated to an appropriate carrier connection for routing to the destination endpoint. Carrier-based channels can use SMPP (Short Message Peer-to-Peer protocol) for communicating to an aggregators or another suitable gateway such that the SMS/MMS message is transferred over a carrier network. Once transmitted to the carrier network, the message will generally be relayed appropriately to arrive at the intended destination. A message in transit may have multiple routing segments that are used in being delivered to an end destination device.

For example, the messaging system 120 can include an interface to one or more SMS Gateways that enable a computer to send and receive SMS text messages to and from a SMS capable device over the global telecommunications network (normally to a mobile phone). The SMS Gateway translates the message sent and makes it compatible for delivery over the network to be able to reach the recipient. The different SMS gateways (or more generally message gateways) can serve as different route options when the message analysis module 130 is determining a channel and/or route to be used for a one or more message transmissions.

SMS Gateways can route SMS text messages to the telco networks via an SMPP interface that networks expose, either directly or via an aggregator that sells messages to multiple networks. SMPP, or Short Message Peer-to-Peer, is a protocol for exchanging SMS messages between Short Message Service Centers (SMSCs) and/or External Short Messaging Entities (ESMEs).

In example embodiments, the destination of a message may be used in determining the candidate message routes (and/or channels). For example, a phone number of a destination endpoint or another identifier associated with the intended recipient of the message may be used to identify the destination network of the intended recipient. Each destination network may be assigned a Mobile Country Code (MCC)/Mobile Network Code (MNC) pair that identifies the specific destination network.

The system can use the phone number associated with the intended recipient of the message to lookup the MCC/MCN pair identifying the destination network. For example, system can determine the MCC/MNC pair using an MCC/MNC directory that lists the MCC/MNC pair corresponding to each phone number. In some embodiments, the MCC/MNC directory may be stored in a routing provider storage. Alternatively, the MCC/MNC directory may be stored at some other network accessible location. In either case, the system can use the phone number associated with the intended recipient of the message to query the MCC/MNC directory and identify the MCC/MNC pair that identifying the corresponding destination network.

The system can use the MCC/MNC pair retrieved from the MCC/MNC directory to identify candidate routing providers and routes that are available to deliver a message to the destination network identified by MCC/MNC pair. For example, the routing provider storage may include a routing provider directory that lists each MCC/MNC pair serviced by the messaging system 120 and the corresponding routing providers and routes available for use with each MCC/MNC pair. That is, the routing provider directory lists the routing providers and routes that are available to the messaging system 120 to the deliver message to the destination network identified by each MCC/MNC pair listed in the routing provider directory.

In example embodiments, the systems and methods may be used in the determining routing and transmission options used in initiating a message transmission as described above.

In other variations, a message transmission option may be used for augmenting an intermediary or end message routing operation, altering multiple message routing options, and/or impacting all routing decisions across the full path of a message. As one related variation, a message transmission option may be communicated as a property of a messaging initiation request when sending to a downstream messaging system. The downstream messaging system could use the delivery attributes and/or transmission options to determine a message communication route/channel option for that downstream messaging system. In another example, the system may be implemented as part of intermediary message routing service such that, while facilitating message delivery, the system could dynamically make routing decisions based on stated or detected delivery attributes.

The message analysis module 130 functions to analyze the message request and select a message transmission option. In general, this can include the selection of the appropriate messaging channel and route based on the particular deliverability attributes of a message request. This may additionally or alternatively include the scheduling and ordering of messages for transmitting messages.

The system may apply various approaches in determining message transmission options.

Figure 2:
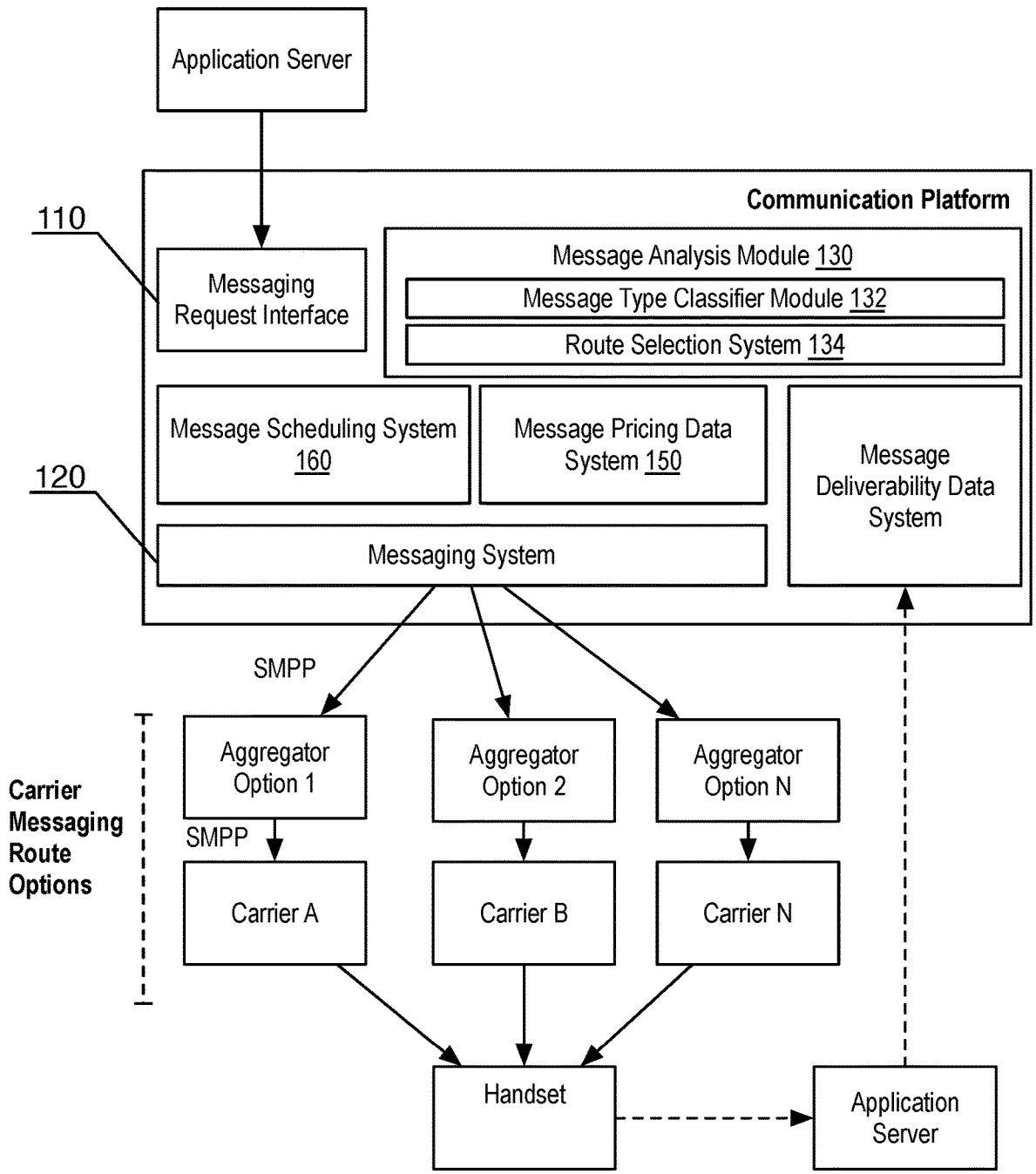
FIG. 2 is an additional system configuration, according to some example embodiments.

In one variation, the message analysis module 130 includes a message type classifier module 132 as shown in FIG. 2, which functions to automatically assign or predict deliverability attributes for a given message request. In particular, the message type classifier module 132 may classify the message content according to different priority classes. These classes may characterize different use cases such as a one-time-password message, a status update message, a marketing message. The classes may characterize different prioritization approaches. These prioritization approaches may establish various objectives related to reliability, timing, quality, and/or value/cost. For example, the set of classes may include classifications corresponding to the classifications of: important-and-urgent, important-not-urgent, low-value-urgent, low-value-not-urgent, and/or other classifications.

The message type classifier module 132 may include one or more heuristics-based rules engines, natural language processing (NLP) text classifiers/analyzers, machine learning models, and/or other processes, which are configured to classify and/or otherwise characterize the type of a messaging request. The message type classifier module 132 may include a data processing pipeline configured using one or more of such processes. The message type classifier module 132 may include a data input that, through the message analysis module 130, receives message request information. Message request information may, for example, include message content, deliverability attributes, destination endpoints, origin endpoints, and/or other message related data. The message type classifier module 132 may additionally include additional data input related to messaging route options, a message deliverability data system 160, a message scheduling data system, and/or other components of the system. The output of the message type classifier module 132 may be communicatively coupled to the message scheduling system 170 and/or the route selection system 134. In one example, the message type classifier takes in the message content of a messaging request and uses a machine learning classifier model to classify the message by different timing priority tiers.

The message type classifier module 132 may additionally or alternatively identify target messaging timing parameters. For example, the expiration date/time of a coupon may be relevant in determining if this message should be prioritized for quick delivery.

Additionally or alternatively, example embodiments of the message analysis module 130 can include a route selection system 134 that functions to select the channel and/or route. The route selection system 134 can include a route selection model, which can be a machine learning classifier model or any suitable data model that can transform a set of message request related properties to a selected or ranking of messaging options. The route selection model can take a set of input features such as the message destination, message content, predicted deliverability attributes, specified deliverability attributes, and/or other contextual information. Other contextual information could include status information from the messaging system 120 such as the current messaging capacity, message queue information, and/or other information for a particular messaging route.

In example embodiments, the route selection system 134 may additionally or alternatively incorporate a rule-based engine, heuristics, and/or other processing systems used in selecting a messaging option. In one variation, a route selection model may be used in identifying a ranked list of top candidate routing options and then a rule-based conditions can be applied in selecting the used routing option. The rule-based conditions could, for example, balance messaging load of the candidate routing options.

The system may additionally include other components that can be specifically configured computer systems used in enabling unique message prioritization capabilities of a communication system/platform. As shown in FIG. 2, some additional components can include a message pricing data system 150, a message deliverability data system 160, a message scheduling system 170 for example.

A message pricing data system 150 functions as a database system managing cost/value of different messaging transmission options. The message pricing data system 150 can store data, track, predict, and/or otherwise provide data related pricing of one or more message transmission options. In the case of carrier network-based messaging (e.g., SMS and/or MMS), the message pricing data system 150 can provide pricing quotes for different potential messaging routes (e.g., SMS/MMS gateways). In addition to cost of use of the various options, the message pricing data system 150 may additionally store or encode information or logic relating to various usage obligations or targets. Different message transmission options may have different pricing models where there could be minimum usage fees, maximum usage limits, different message volume pricing tiers, and the like. Pricing and costs (to the customer and/or the service provider) may vary with usage, timing, and/or other conditions. Such rules can be incorporated such that pricing cost can be considered at a per message level as well as across all messaging traffic.

A message deliverability data system 160 functions to collect delivery data. The message deliverability data system 160 can make use of one or more forms of deliverability feedback that report on the success and/or timing of message delivery. The message delivery data system 160 may actively include feedback inputs used in collecting data on message deliverability. The message delivery data system 160 may additionally or alternatively interface with an external delivery feedback data source. Data from the message deliverability data system 160 may source training data to the route selection system 134 to facilitate training and improvement of route selection.

A message scheduling system 170 functions to manage scheduled delivery of a message. The message scheduling system 170 can be used to schedule message delivery. The message scheduling system 170 may incorporate time-based scheduling and/or priority-based scheduling (e.g., a messaging queue). The message scheduling system 170 may include special configuration to dynamically adjust message scheduling to meet different communication demands. The message scheduling system 170 may store, manage, or otherwise access messaging history data to facilitate predicting message volume across the communication platform, of different message types, different message routes, and/or other factors impacting deliverability of messages. In one variation, the message scheduling system 170 can include a messaging queue where messaging requests awaiting transmission are queued. The requests can be queued in a prioritized manner, which may incorporate various message transmission options into the ordering of messages and/or updates to the order of messages. As an alternative or additional variation, a message picking system may actively query and select messages for transmission from a pool of messages, where the selection is based in part on message transmission options of the messages.

Figure 3:
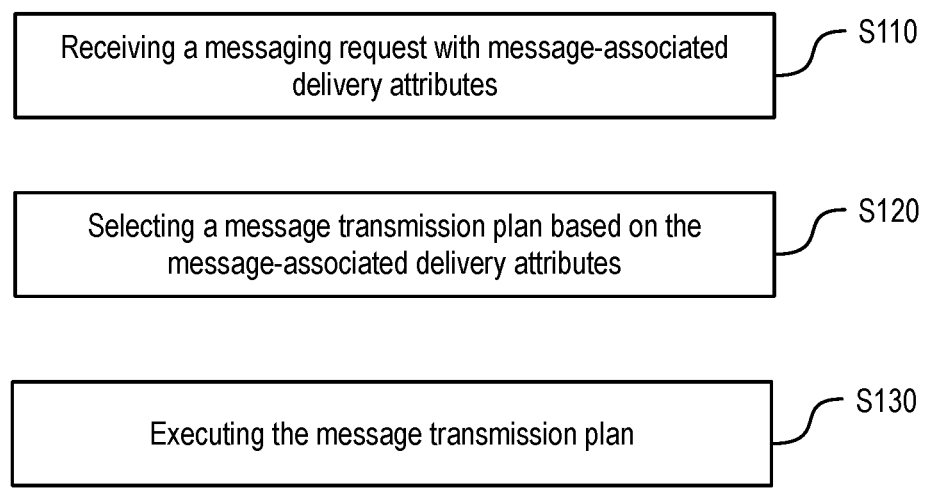
FIG. 3 is a flow diagram of a method of an example embodiment using message-associated delivery attributes in executing a message transmission plan.

As shown in FIG. 3, a method for automated message delivery prioritization can include receiving a messaging request with message-associated delivery attributes S110, selecting a message transmission plan based on the message-associated delivery attributes S120, and executing the message transmission plan S130. The method can be used in variations where the message associated delivery attributes are explicitly specified by a requesting entity such as deliverability attributes included in a messaging request or deliverability attribute defaults stored in configuration of an account making the request. The method may additionally or alternatively be used in variations where the message-associated delivery attributes are implicit deliverability attributes that are extracted or predicted from the message request and/or context of the message request.

The message transmission plan selected and executed through the method may result in appropriately scheduling a message transmission and/or selection of a communication channel and/or route to fulfilling delivery to a recipient. The method may additionally be used in adjusting crediting and tracking messaging of an account according to dynamic message values set according to the method. This may be used such that the cost of sending messages is flexible according to delivery objectives.

The method may incorporate various capabilities such as interpretation of request-specified deliverability attributes, automatic interpretation of priority-related context of a messaging request, use of a data model in automating the selection of messaging a route used in a message transmission plan, and/or the use of delivery feedback in improving message-appropriate delivery.

Figure 4:
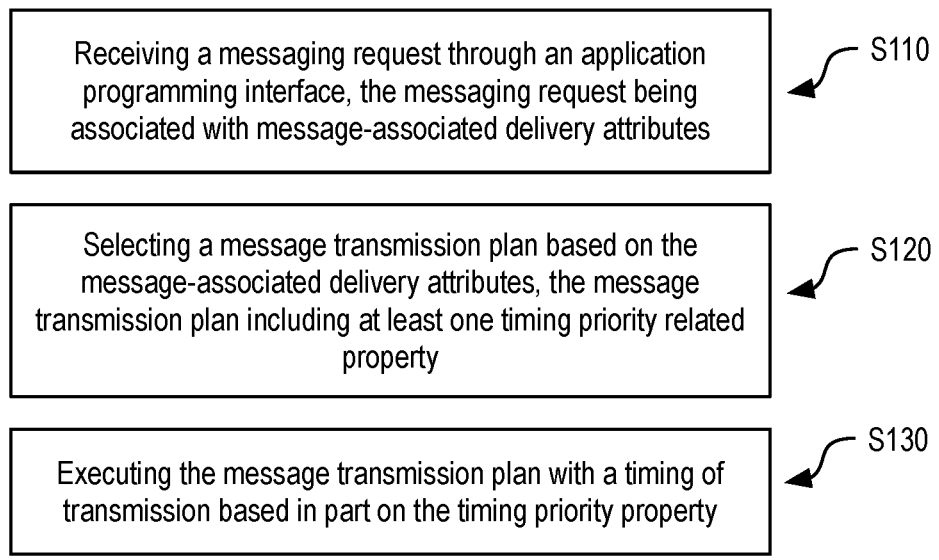
FIG. 4 is a flow diagram of an additional method of an example embodiment using a message transmission plan including a timing priority related property.

As shown in FIG. 4, a variation that incorporates the method into dynamic temporal prioritization of messages may include receiving a messaging request through an application programming interface, the messaging request being associated with message-associated delivery attributes (S110); selecting a message transmission plan based on the message-associated delivery attributes, the message transmission plan including at least one timing priority related property (S120); and executing the message transmission plan with a timing of transmission based in part on the timing priority property (S130).

An additional or alternative method variation may include blocks S120 and S130 including: selecting a message transmission plan based on the message-associated delivery attributes, the message transmission plan including at least one quality priority related property (S120); and executing the message transmission plan with a timing of transmission based in part on the quality priority property (S130).

An additional or alternative method variation may include blocks S120 and S130 including: selecting a message transmission plan based on the message-associated delivery attributes, the message transmission plan including at least one reliability priority related property (S120); and executing the message transmission plan with a timing of transmission based in part on the reliability priority property (S130).

An additional or alternative method variation may include blocks S120 and S130 including: selecting a message transmission plan based on the message-associated delivery attributes, the message transmission plan including at least one value/cost priority related property (S120); executing the message transmission plan with a timing of transmission based in part on the value/cost priority property (S130).

Figure 5:
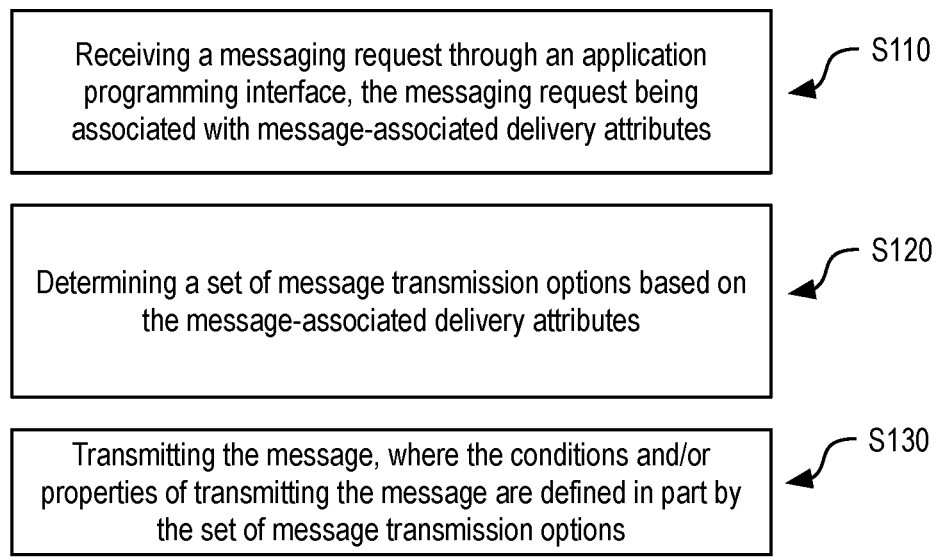
FIG. 5 is a flow diagram of an additional method of an example embodiment using message transmission options in transmitting a message.

As shown in FIG. 5, one method variation of selecting a message transmission plan and executing the message transmission plan can include: receiving a messaging request through an application programming interface, the messaging request being associated with message-associated delivery attributes (S110); determining a set of message transmission options based on the message-associated delivery attributes (S120); and transmitting the message, where the conditions and/or properties of transmitting the message are defined in part by the set of message transmission options (S130). The message transmission options may be based on one or more of various timing properties, reliability properties, quality properties, value properties, and/or other types of properties.

Figure 6:
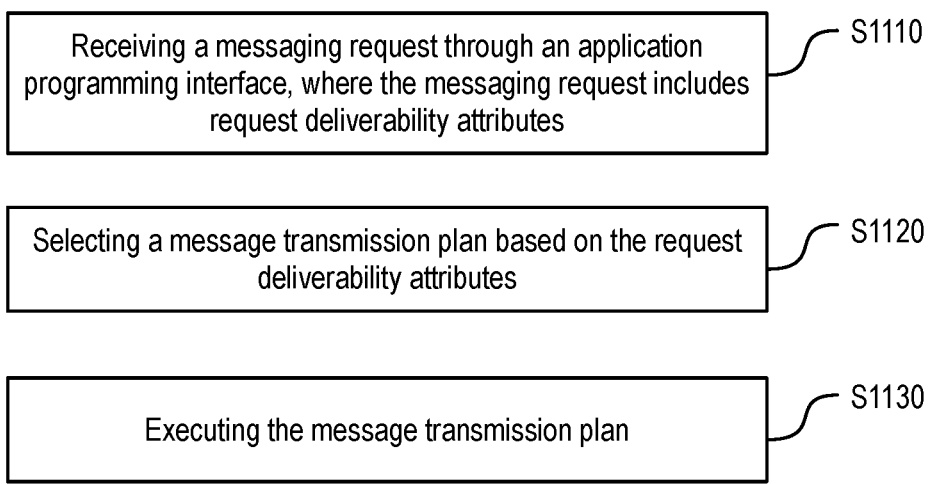
FIG. 6 is a flow diagram of an additional method of an example embodiment involving a messaging request made through an application programming interface.

As shown in FIG. 6, a variation that uses message-associated deliverability attributes may include: receiving a messaging request through an application programming interface, where the messaging request includes request deliverability attributes defining at least a subset of message-associated delivery attributes S1110; selecting a message transmission plan based on the request deliverability attributes S1120; and executing the message transmission plan S1130. This variation may be used to enable API request specified deliverability attributes such as timing parameters; value/cost conditions (e.g., limits, quotes, or bids); reliability conditions (e.g., preferences for managing reliability); message delivery quality; and/or other variables or transmission-related properties in sending a communication. For example, the request delivery attributes can include at least one request delivery attribute selected from the set of: timing parameters, cost conditions, and reliability conditions.

In example embodiments, the method can include: analyzing the messaging request and identifying at least one predicted deliverability attribute, the predicted delivery attribute can define at least a subset of the message-associated delivery attributes; and the selecting the message transmission plan based on the message-associated delivery attributes can be based on the predicted delivery attribute.

Figure 7:
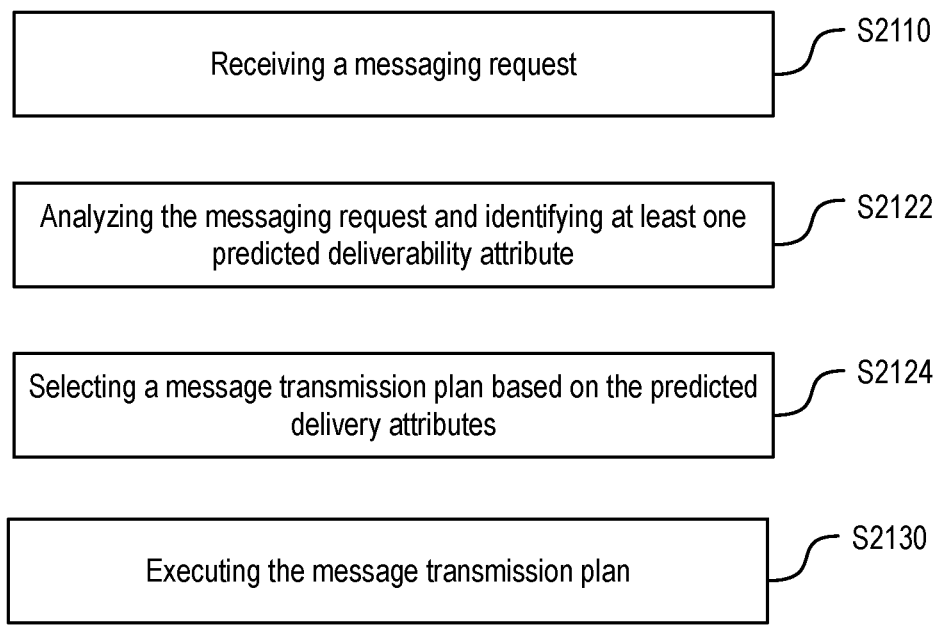
FIG. 7 is a flow diagram of an additional method of an example embodiment that includes analyzing a message request and identifying a predicted delivery attribute.

As shown in FIG. 7, such a variation using automatic interpretation of priority-related context of a message request can include receiving a messaging request 52110; analyzing the messaging request and identifying at least one predicted deliverability attribute S2122; selecting a message transmission plan based on the predicted delivery attributes S2124; and executing the message transmission plan 52130. Automatic interpretation of message may be used in combination with API-specified deliverability attributes or may be used as the main source of deliverability attributes. The predicted deliverability attribute can be part of a set of message-associated delivery attributes.

Variations using automatic interpretation and/or determination of delivery attributes may be used for setting timing priority properties. One exemplary variation, method variations can include analyzing the messaging request and identifying at least one predicted delivery attribute includes detecting a messaging time window of the messaging request through analysis of the message content. This messaging time window could be temporal prioritization of a message request relative to other message requests, and/or determination of other temporal or sequencing related priority conditions.

Variations using automatic interpretation and/or determination of delivery attributes could similarly be used for other transmission option properties such as quality properties, reliability properties, and/or value properties.

In example embodiments, the method can include: interfacing with a message route machine learning model that translates delivery attribute inputs into a candidate message route output; wherein selecting the message transmission plan is based on the message-associated delivery attributes, which are based on a first candidate message route output resulting from inputting the message-associated delivery attributes into the message route machine learning model.

Figure 8:
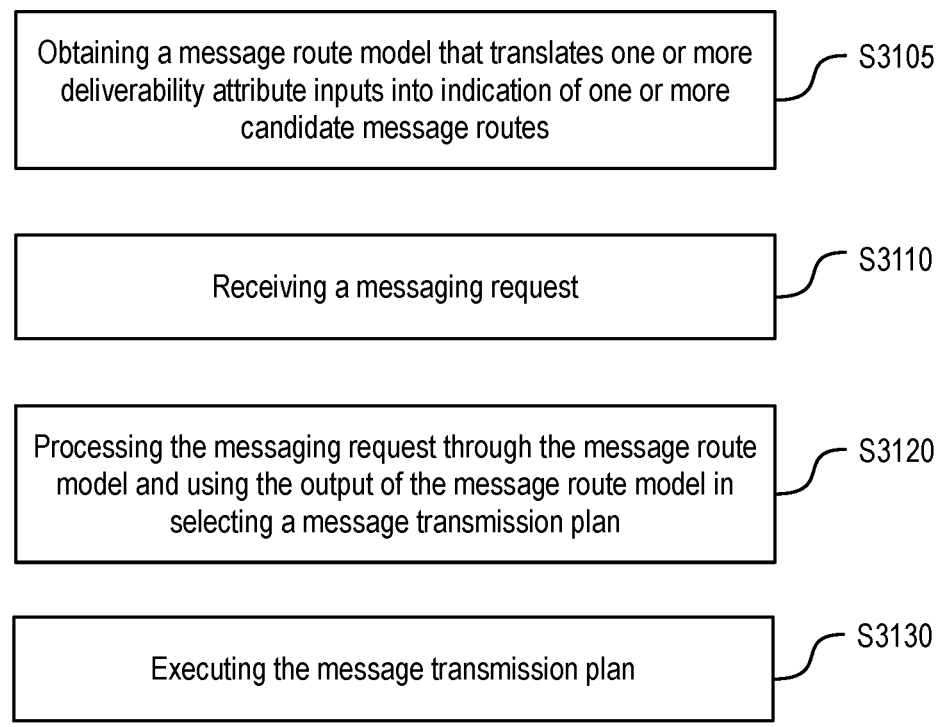
FIG. 8 is a flow diagram of an additional method of an example embodiment using a message route model.

As shown in FIG. 8, a variation of the method that makes use of a data model in automating the selection of a messaging route can include: obtaining a message route model that translates one or more deliverability attribute inputs (and other inputs) into indication of one or more candidate message routes S3105; receiving a messaging request S3110; processing the messaging request through the message route model and using the output of the message route model in selecting a message transmission plan S3120; and executing the message transmission plan S3130.

When combined with a variation with message-associated deliverability attributes, API specified deliverability attributes and/or other message-associated deliverability attributes may be used as input into the message route model.

When combined with the variation for automatic interpretation of priority-related context of a message request, one or more deliverability attributes may be used as input into the message route model.

In such a variation, obtaining the message route model can include training of the message route model. The message route model may use historical data.

The message route model can additionally be trained to incorporate a variety of model feature inputs including the deliverability attributes, basic message request information like recipient endpoint, and/or recipient-related information (e.g., geographic location, carrier network, mobile/landline designation, etc.). Other feature inputs may include contextual information such as timing, status of the various messaging channels/routes used by the communication platform, related messaging requests (e.g., requests sharing an originating account, content, and/or destination), and/or other aspects. Accordingly, example embodiments may include training the message route machine learning model. Training the message route machine learning model can include collecting training data, which may be based in part of receiving message delivery feedback and/or other forms of feedback data. Accordingly, the method can additionally include receiving delivery feedback after execution of the message transmission plan and updating the message route machine learning model based on the delivery feedback.

Figure 9:
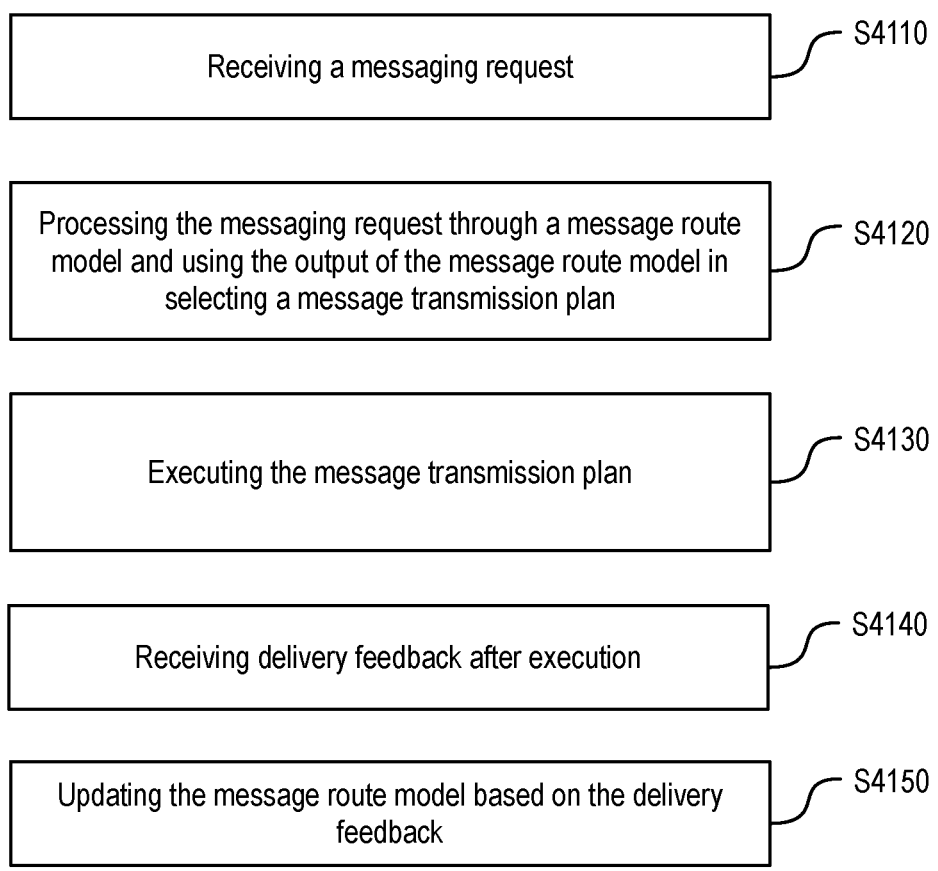
FIG. 9 is a flow diagram of an additional method of an example embodiment using delivery feedback to update a message route model.

As shown in FIG. 9, a variation of the method that uses delivery feedback for improving message-appropriate delivery may include receiving a messaging request S4110; processing the messaging request through a message route model and using the output of the message route model in selecting a message transmission plan S4120; executing the message transmission plan S4130; receiving delivery feedback after execution S4140; and updating the message route model based on the delivery feedback S4150. This variation can function to collect results of a message transmission and using those results in enhancing a message route model. This variation may be more generally configured for improvement of any process involved in selecting a message transmission plan based on the message-associated delivery attributes.

These variations may be implemented in connection with a system of a communication service/platform such as described above but may be implemented with any suitable system. In particular, the method and its variations of the present disclosure may be operations performed by a system including one or more computer-readable mediums (e.g., a non-transitory computer-readable medium) storing instructions that, when executed by one or more computer processors of a communication platform, cause the communication platform to perform operations of the system or method described herein.

Receiving a messaging request with message-associated delivery attributes, as in block S110 and its variations, functions to initiate one or more system processes for initiating or servicing a message communication transmission. In example embodiments, this more specifically functions to obtain a programmatic request. The messaging request can be received through a programmatic interface such as an API or as a result of a messaging instruction executed in connection with a specially configured computer system. The messaging request may be made in response to a user interface interaction. For example, a user may initiate a messaging request through an application or control interface.

A messaging request can be initiated from a client computer device that is associated with an account of a communication platform (e.g., a developer account). In example embodiments, the messaging request may be authenticated as and uniquely associated with a specific account and/or a subaccount. The account may have one or more communication endpoints associated with it, which may be used as origin endpoints when transmitting the message. For example, the messaging request may be made with a parameter specifying a specific origin phone number registered to an account, where the account is associated with the messaging request.

The message request is a data object characterizing the properties of a message. Herein, the method is primarily associated with message requests that are programmatically initiated (e.g., an A2P message). The message request could be one initiated from an inbound received message such as one received by an origin communication device (e.g., a phone-based sender of a P2P message).

The message request may be made as a single transaction message request, such as a request for a single message to be sent to a single recipient endpoint accessible at a recipient client device. For example, a transactional message may be sent to a recipient about some activity related to their account.

The message request may be a group message request specifying one or more recipients and/or one or more messages. A group message may be part of a bulk messaging request where multiple independent messages are sent to different recipients. For example, a marketing-related message may be requested for a large number of recipients, and this may trigger individual messages for each of the recipients. In some variations or instances, a group message request may be made where the message is sent as part of a group chat (e.g., having three or more participants messaging within a channel). If multiple messages are to be sent, then each of those may be processed individually to optimize deliverability for each message transmission. In example embodiments, a set of outbound messages may be processed as a group such that transmission of the messages is normalized or made consistent across the group of messages.

In general, the message request will include one or more destination endpoints, one or more origin endpoints, and message content. In some cases, some or some of these properties may be specified indirectly such as through system or account configuration. For example, all messages may be automatically assigned an origin endpoint that is associated with an account. The message content could include any suitable type of media content including, text, audio, image data, video data, multimedia, interactive media, data, and/or any suitable type of message content.

In example embodiments, a message request may include one or more deliverability attributes such as a reliability property, a timing property, a quality property, and/or value property. In some cases, deliverability properties may be exposed. For example, one message API may support specification of one of a set of different message prioritization properties (e.g., high priority or low priority). Accordingly, block S110 may include receiving a messaging request through an application programming interface, where the messaging request includes request deliverability attributes (as in S1110).

A reliability property may characterize a desired level of delivery reliability. A reliability property set for high reliability may lead to the selection of a message routing option where a high probability of messages being successfully delivered. Message routing options with high probability of message delivery success could correspond with route options (e.g., messaging gateways) scored, tracked, predicted to have higher occurrences of successful delivery. In some cases, such reliability prioritization may be based on machine learning assessment of the messaging request. For example, properties such as destination, region, content, and other message properties may result in different levels of reliability for various routes. Conversely, a reliability property set for low reliability may select a message route with less prioritization of delivery reliability. For example, cost or timing may be more prioritized. In example embodiments, there may exist at least two classes of reliability properties, high priority and default priority. There may also be an option for a guaranteed reliability option which may select transmission plan where delivery can be affirmatively confirmed. Such a delivery confirmation option could use a channel/route that has delivery receipts enabled or where automated messaging is used to collect delivery feedback.

A timing property may characterize various timing/temporal related objectives such as sending with high urgency or low urgency.

In one variation, timing properties can define different classifications of timing-related prioritization. For example, a timing property could indicate an urgent classification or a non-urgent classification. In this example, urgent classifications may be prioritized for transmission above non-urgent classifications. This may alter how message requests are queued or sequenced for servicing.

In another variation, timing properties can define one or more timing windows, limits, or restrictions. In one variation, a timing window may be defined by one or more timing property to indicate one or more timing windows in which a message is permitted, required, or preferred for being sent or not sent. For example, one timing property could set an hour-long window in which a message can be sent. In another variation, a timing property could define a temporal limit which indicates a point in time before or after which a message is permitted, required, or preferred to be transmitted or not. For example, a timing limit could set a time point which would serve as the latest point in time when a message is sent. A timing property could be set as a global time period or a relative (e.g., some amount of time relative to another time point like the time of a request). Other suitable time properties can similarly be used such as the other examples and variations described herein.

A quality property may characterize message objectives such as acceptable changes or limits to the message content. For example, a quality property may prioritize a message transmission option of a transmission plan where there is higher calculated confidence in the message transmission satisfying the quality property. A quality property may mark a message for high content quality (e.g., fewer or no changes to content) where a transmission plan is selected that prioritizes options that lead to enhanced content quality.

A value property may characterize pricing or cost restrictions or goals. The value property in example embodiments may specify a maximum price. The value property in example embodiments may be coupled with other properties. In example embodiments, value properties can be combined with other properties to define different groups of conditions. These maybe used to define arbitrary rules for defining processes determination of message transmission options and/or transmission plans. For example, a first price may be specified for a first delivery time and a second lower price for a second later delivery time.

The message request may further support various features such as setting tiers of priorities, their own route prioritization rules, and the like.

In example embodiments, various message-related features or properties are specified explicitly within the message request. In other variations, some or all message-related features or properties may be specified through account configuration or in other ways. For example, an account with a messaging platform may set the default message delivery attributes. As another example, an account may enable a feature to automatically predict delivery attributes based on the properties of a message request.

Block S120, which includes selecting a message transmission plan based on the message-associated delivery attributes, functions to determine an appropriate message transmission option for one or more messages. The message transmission plan can be a planned way of transmitting a message or at least parameters used to inform relaying the message. The message transmission plan can be defined by one or more message transmission options.

The message transmission plan can characterize the channel to be used, the route option (e.g., which SMS/MMS gateway), timing of transmission, ordering of a message request into a queue, cost/value settings, and/or other properties related to the transmission of a message. The message transmission plan can be based on one or more message transmission options, wherein the message transmission plan is characterized by, includes, or otherwise corresponds to some option based on a delivery attribute. In one variation, the message transmission plan includes at least one timing priority related property based on a timing delivery attribute. As additional or alternative variations, the message transmission plan can additionally or alternatively include or be based on reliability properties, quality properties, and/or value properties.

Different variations of the method may use different processes for the selection of a message transmission plan.

As discussed, example embodiments may have delivery attributes automatically extracted from the messaging request, which will generally involve analyzing the messaging request and identifying at least one predicted deliverability attribute (as in block S2122). In other variations, a messaging request may include or be associated with delivery attributes. Such variations may involve collecting additional contextual input data such as message channel data and/or route data.

Analyzing the messaging request and identifying at least one predicted deliverability attribute (as in block S2122) functions to predict one or more deliverability attributes. With at least one predicted delivery attribute the selection of a message transmission plan can be based (at least in part) on the predicted delivery attribute(s) (as in block S2124).

Analysis and prediction of a deliverability attribute may be used in combination with other message-associated deliverability attributes, such that they may supplement, augment, and/or replace such message-associated deliverability attributes (e.g., such as specifying priority in a messaging request). For example, explicit timing properties may be supplied in association with a messaging request. However, in the absence of an explicitly specified timing property, message content and/or other message properties can be analyzed to predict timing urgency or other properties.

A heuristics-based rules engine, an NLP text classifier/analyzer, machine learning model, and/or other process may be used in classifying and analyzing the messaging request. Analyzing a messaging request can include processing the message content to classify the type of message. In one variation, message content may be classified using a machine learning model to assign a message type label for assumed priority. Analyzing a messaging request may additionally include detecting deliverability windows or other message type classifiers. For example, message identifying a due date or deadline may be used in setting specific delivery window targets. The recipients, the timing of the messaging requests, and/or other factors can additionally be incorporated into the analysis of the messaging request.

In one variation, analyzing the messaging request may additionally or alternatively include analyzing recipient patterns of the messaging request, which can function to detect the uniqueness of the message for a particular user. A messaging request to send a marketing message to thousands of recipients may have urgency evaluated differently from a message to a single individual.

In another variation, analyzing the messaging request may additionally or alternatively include analyzing a pattern of content of multiple messaging requests. One account may make multiple requests and patterns across multiple messages may be included in the analysis in determining deliverability attributes. In one specific application of analyzing patterns of content of multiple messaging requests, message content may be analyzed and compared (as part of a similarity comparison) to previous messages with deliverability attributes. Messages with similar content may have been previously indicated or automatically classified with various deliverability attributes. This may be performed across accounts and/or within an account of a communication platform.

In another variation, analyzing the messaging request may additionally or alternatively include detecting interaction messages, which may serve as a specific form of message classification for the detection of particular types of messages such as one-time-passcode (OTP) messages and/or application interaction-related messages. Examples of such messages may include messages confirming or notifying of particular interactions may be time sensitive. In such a variation, analyzing the messaging request and identifying the at least one predicted delivery attribute can include detecting, using message content analysis, a message request as an interaction message. Detecting the interaction message can include, for example, detecting key phrases in message content according to some content analysis logic and/or processing the message request (and the message content) through a message classification machine learning model. For example, a message mentioning a one-time code along with a code may be classified as an OTP message. For a time sensitive message like a OTP message, a timing-related delivery attribute can be assigned indicating high timing priority. Additional or alternative delivery attribute properties may be assigned depending on the type of interaction message. In the case of an OTP message or other type of time-sensitive interaction message, executing the message transmission plan in block S130 can have timing of the transmission based in part on the timing priority property such that executing the message transmission plan is done high timing priority. A high timing priority can be a classification used in prioritizing transmission of the message request before a message request with lower timing priority (or without a timing priority property). A high timing priority may also be a classification used in setting a transmission limit such that selection of a transmission plan satisfies or targets the transmission limit. For example, a messaging system may send a message using whichever route can best transmit an OTP-classified message within a 1-5 minute window (or any suitable fixed time window threshold).

In another variation, analyzing the messaging request may additionally or alternatively include detecting messaging time windows, which functions to determine timing targets or limits. Detecting a messaging time window may include performing natural language processing and/or other content analysis to detect time windows. In particular this may involve detecting dates or time deadlines within message content. In one example, a message may be a reminder for an upcoming appointment specifying the date of the appointment for a few days out. Sending the message within that current day may be sufficient.

In example embodiments where message analysis is used in combination with an option to specify deliverability attributes, deliverability attributes referenced within a message request or with a data-association to the message request may be used in furthering the training and analysis of other messaging requests. For example, the method may include learning what types of messages are assigned various deliverability attributes and applying that to analysis of other messages.

In other variations, all or some of the deliverability attributes may be specified within the messaging request or in association with the messaging request. Delivery attributes may be selected from the set of timing properties, cost/value properties, reliability properties, and/or quality properties. When specified with the messaging request, the messaging request can include request delivery attributes defining at least a subset of the message-associated delivery attributes. one or more deliverability attribute can be a parameter of an API request. When specified in association with the messaging request, one or more deliverability attribute may be accessible because of a data association of the message request. The messaging request may be made in association with an account, messaging policy resource, an origin endpoint, a destination endpoint. In example embodiments, one or more deliverability attributes may be preconfigured for one of these data resources and then applied for messages made in association with them. For example, an account may pre-configure all messages from a set of origin endpoints would be high priority and time sensitive because those phone numbers would only be used for urgent messages.

In one variation, selecting a message transmission plan based on the message-associated delivery attribute may additionally or alternatively include processing a messaging request through the message route model and using the output of the message route model in selecting a message transmission plan (as in block S3120), which may function to apply a machine learning model (or another data-based model) to selecting a message transmission plan. The use of a route model may additionally be accompanied with previously obtaining a message route model that translates one or more deliverability attribute inputs (and other inputs) into indication of one or more candidate message routes (as in block S3105). In one variation, obtaining the message route model includes training the message route model and/or updating the message route model. In other variations, the message route model may be loaded for use or accessed/used from a remote system.

Selecting a message transmission plan based on the message-associated delivery attribute may additionally or alternatively include collecting additional contextual input data. The contextual input data may include message channel and/or route history data. This data may be used in the selection process.

Example embodiments may additionally include detecting recipient properties and altering message delivery according to the recipient properties, which functions to adapt message delivery based on the recipient endpoint. This may adapt the delivery of a message based on known or predicted communication properties or patterns for a communication device (e.g., a phone) and/or a user of the endpoint. Detecting recipient properties can include detecting recipient message interaction patterns. The message interactions patterns may include message reading time, recipient estimated time to read based on a difference between transmission and detected viewing/interacting with a message, and/or other considerations. For example, message scheduling may be adjusted based on message reading patterns that indicate if a user quickly responds to messages or slowly.

Block S130, which includes executing the message transmission plan, functions to initiate and transmit a message for communication to one or more destination communication devices (associated with a destination endpoint).

Executing the message transmission plan may be performed based on the message transmission plan. The message transmission plan can specify messaging channel, messaging route, and/or optional message transmission schedule settings. Accordingly, executing the message transmission plan may include selecting a messaging channel, selecting a messaging route, and/or scheduling a message transmission based at least in part on the message transmission plan. Scheduling message transmission may additionally include scheduling multiple message transmissions. Scheduling of messages may be differentiated based on recipients, geographic locations of recipients, channels, routes, other messaging requests, and/or other factors.

With a communication channel and route selected, a communication conveying the message can be transmitted to one or more external communication service (or routed directly) for delivery to one or more recipient devices associated with the recipient endpoints. For SMS/MMS messaging channels this may include transmitting a message request to one or more messaging gateways, which then facilitate connection to a telephony carrier network for delivery to the endpoint. For an OTT messaging channel, an API request may be communicated to an appropriate API endpoint of the communication service of the OTT.

In example embodiments, such as those making use of a message route model may include receiving delivery feedback after execution; and updating the message route model based on the delivery feedback. Received delivery feedback may be used in auditing and/or confirming if and when messages are transmitted in a way that fulfills delivery priority targets. Receiving delivery feedback may include receiving feedback reporting time of delivery and/or actions performed with the message (e.g., delivery confirmation, read confirmation, user-action performed confirmation) and updating prioritization analysis and planning for subsequent messages. The delivery feedback may be used in updating the training of a message route model. Training the message route model may additionally or alternatively include training using inputs such as: message content, message route/channel used, message delivery feedback, combinations of message content to explicitly stated delivery attributes; message, timing of message requests, and/or other model inputs. In one example embodiment, a model is trained to predict delivery attributes using training on training data including on pairing of message request properties (e.g., message content, grouping of requests, timing, etc.) and explicit delivery attributes. In this way, input of a message request can output a predicted delivery attribute output.

Software Architecture

Figure 10:
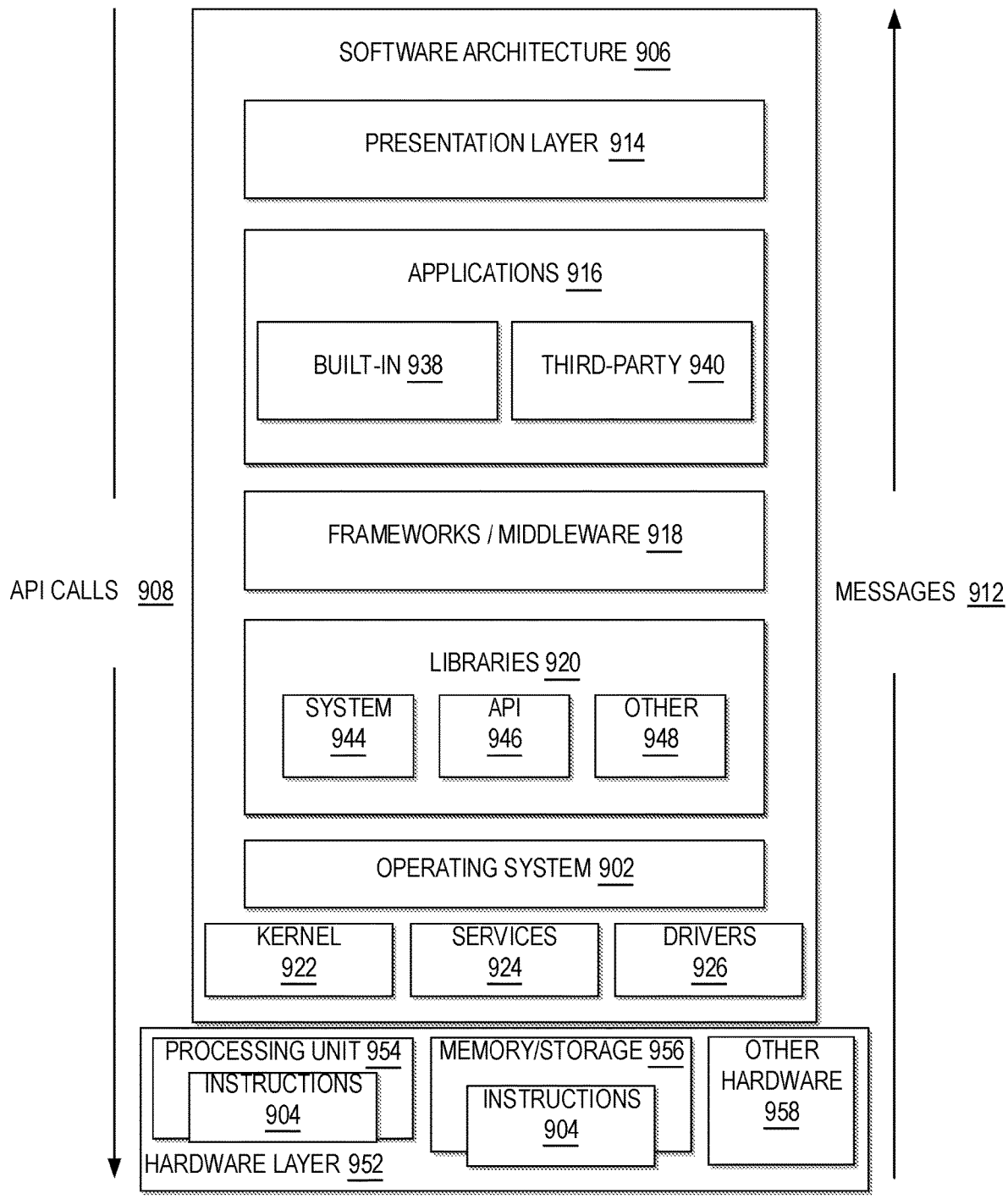
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating an example software architecture 906, which may be used in conjunction with various hardware architectures herein described. FIG. 10 is a non-limiting example of a software architecture 906 and it will be appreciated that many other architectures may be implemented to facilitate the functionality described herein. The software architecture 906 may execute on hardware such as machine 1000 of FIG. 11 that includes, among other things, processors 1004, memory 1014, and (input/output) I/O components 1018. A representative hardware layer 952 is illustrated and can represent, for example, the machine 1000 of FIG. 11. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 10, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 11:
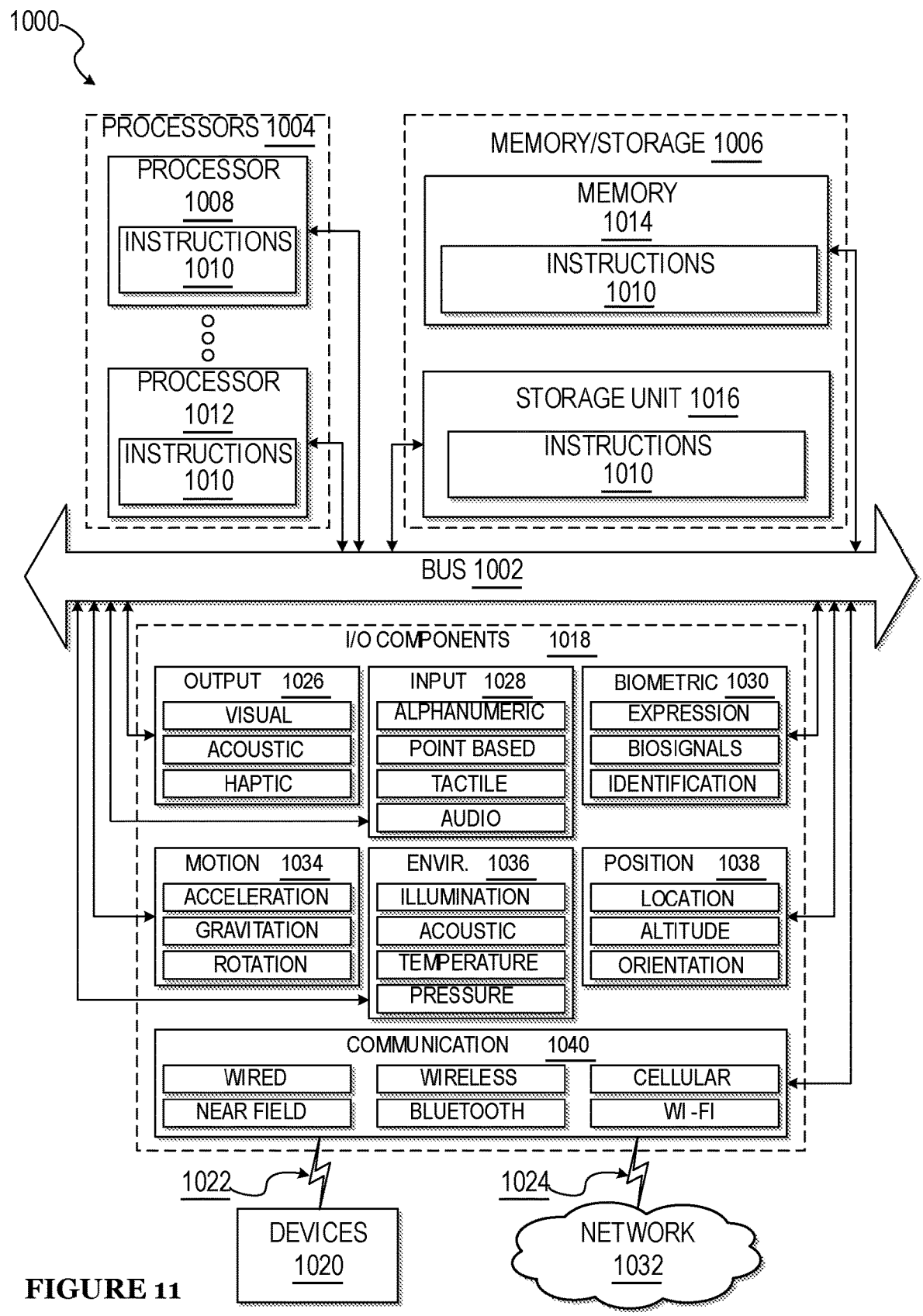
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 11 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In example embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 11. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or software logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

What is claimed is:

1. A method comprising:
   receiving, via an application programming interface, a messaging request of an entity to transmit one or more messages to a plurality of users, the messaging request being associated with message-associated delivery attributes comprising two or more of a timing priority attribute, a reliability priority attribute, a content quality attribute or a message delivery cost attribute for transmitting the one or more messages to the plurality of users;
   selecting one or more message transmission options using a machine learning model and based on the message-associated delivery attributes, the selected one or more message transmission options comprising at least one of a messaging channel or a messaging route for transmitting the one or more messages to the plurality of users;
   causing the one or more messages to be transmitted to the plurality of users using the selected one or more message transmission options;
   receiving delivery feedback after transmission of the one or more messages to the plurality of users; and
   re-training the machine learning model based on the delivery feedback.

2. The method of claim 1, further comprising:
   predicting, based on analysis of the message request, at least one of the message-associated delivery attributes, wherein selecting the one or more message transmission options is based on the at least one predicted message-associated delivery attribute.

3. The method of claim 2, wherein predicting, based on the analysis of the message request, the at least one of the message-associated delivery attributes further comprises:
   detecting a messaging time window of the messaging request.

4. The method of claim 3, wherein predicting, based on the analysis of the message request, the at least one of the message-associated delivery attributes further comprises:
   identifying the message request as an interaction message indicating that the one or more messages are to be transmitted with high timing priority.

5. The method of claim 1, wherein selecting the one or more message transmission options using the machine learning model and based on the message-associated delivery attributes further comprises:
   applying the machine learning model to the message-associated delivery attributes; and
   obtaining an output of the machine learning model, the output indicating the one or more message transmission options.

6. The method of claim 5, further comprising training the machine learning model.

7. A system comprising:
   a memory; and
   one or more processors, coupled to the memory, to perform operations comprising:
   receiving, via an application programming interface, a messaging request of an entity to transmit one or more messages to a plurality of users, the messaging request being associated with message-associated delivery attributes comprising two or more of a timing priority attribute, a reliability priority attribute, a content quality attribute or a message delivery cost attribute for transmitting the one or more messages to the plurality of users;
   selecting one or more message transmission options using a machine learning model and based on the message-associated delivery attributes, the selected one or more message transmission options comprising at least one of a messaging channel or a messaging route for transmitting the one or more messages to the plurality of users;
   causing the one or more messages to be transmitted to the plurality of users using the selected one or more message transmission options;
   receiving delivery feedback after transmission of the one or more messages to the plurality of users; and
   re-training the machine learning model based on the delivery feedback.

8. The system of claim 7, the operations further comprising:
   predicting, based on analysis of the message request, at least one of the message-associated delivery attributes, wherein selecting the one or more message transmission options is based on the at least one predicted message-associated delivery attribute.

9. The system of claim 8, wherein predicting, based on the analysis of the message request, the at least one of the message-associated delivery attributes further comprises:
   detecting a messaging time window of the messaging request.

10. The system of claim 9, wherein predicting, based on the analysis of the message request, the at least one of the message-associated delivery attributes further comprises:

identifying the message request as an interaction message indicating that the one or more messages are to be transmitted with high timing priority.

11. The system of claim 7, wherein selecting the one or more message transmission options using the machine learning model and based on the message-associated delivery attributes further comprises:
applying the machine learning model to the message-associated delivery attributes; and
obtaining an output of the machine learning model, the output indicating the one or more message transmission options.

12. The system of claim 11, the operations further comprising training the machine learning model.

13. A non-transitory computer-readable medium storing instructions that, when executed by one or more processors, cause the one or more processors to perform operations comprising:
receiving, via an application programming interface, a messaging request of an entity to transmit one or more messages to a plurality of users, the messaging request being associated with message-associated delivery attributes comprising two or more of a timing priority attribute, a reliability priority attribute, a content quality attribute or a message delivery cost attribute for transmitting the one or more messages to the plurality of users;
selecting one or more message transmission options using a machine learning model and based on the message-associated delivery attributes, the selected one or more message transmission options comprising at least one of a messaging channel or a messaging route for transmitting the one or more messages to the plurality of users;
causing the one or more messages to be transmitted to the plurality of users using the selected one or more message transmission options;
receiving delivery feedback after transmission of the one or more messages to the plurality of users; and
re-training the machine learning model based on the delivery feedback.

14. The non-transitory computer-readable medium of claim 13, the operations further comprising:
predicting, based on analysis of the message request, at least one of the message-associated delivery attributes, wherein selecting the one or more message transmission options is based on the at least one predicted message-associated delivery attribute.

15. The non-transitory computer-readable medium of claim 14, wherein predicting, based on the analysis of the message request, the at least one of the message-associated delivery attributes further comprises:
detecting a messaging time window of the messaging request.

16. The non-transitory computer-readable medium of claim 15, wherein predicting, based on the analysis of the message request, the at least one of the message-associated delivery attributes further comprises:
identifying the message request as an interaction message indicating that the one or more messages are to be transmitted with high timing priority.

17. The non-transitory computer-readable medium of claim 13, wherein selecting the one or more message transmission options using the machine learning model and based on the message-associated delivery attributes further comprises:
applying the machine learning model to the message-associated delivery attributes; and
obtaining an output of the machine learning model, the output indicating the one or more message transmission options.

18. The non-transitory computer-readable medium of claim 17, the operations further comprising:
training the machine learning model.

\* \* \* \* \*